J. McDERMOTT.
ANTISLIP DEVICE FOR VEHICLE WHEELS.
APPLICATION FILED FEB. 15, 1921.
1,389,204.
Patented Aug. 30, 1921.
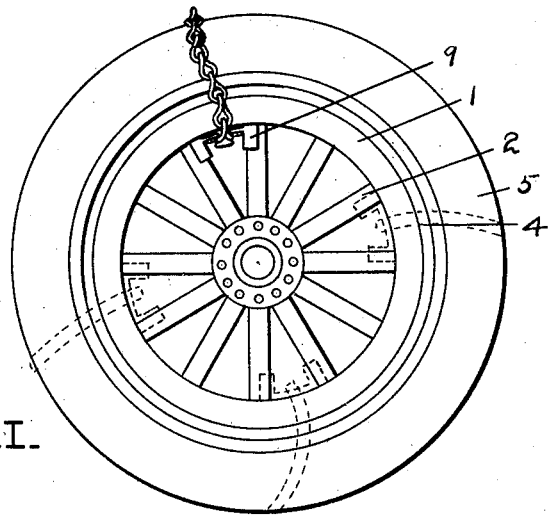
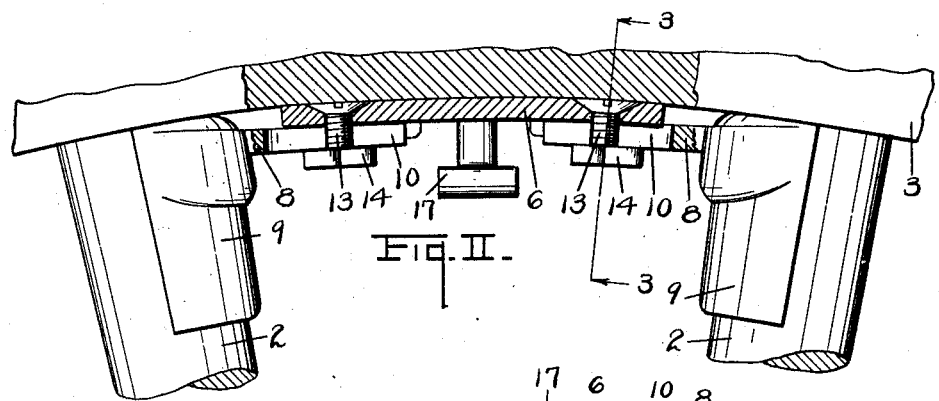
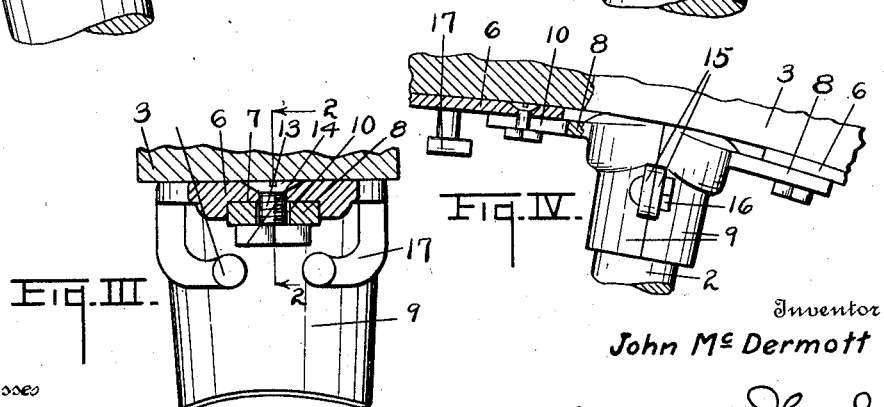
Inventor
John McDermott
Witnesses
Fred Ullrich
M. Louise Thurston
By Chappell Earl
Attorneys

UNITED STATES PATENT OFFICE.

JOHN McDERMOTT, OF KALAMAZOO, MICHIGAN.

ANTISLIP DEVICE FOR VEHICLE-WHEELS.

1,389,204.    Specification of Letters Patent.    Patented Aug. 30, 1921.

Application filed February 15, 1921. Serial No. 445,149.

*To all whom it may concern:*

Be it known that I, JOHN McDERMOTT, a citizen of the United States, residing at Kalamazoo, county of Kalamazoo, State of Michigan, have invented certain new and useful Improvements in Antislip Devices for Vehicle-Wheels, of which the following is a specification.

This invention relates to improvements in anti-slip devices for vehicle wheels.

The main objects of this invention are:

First, to provide an improved means for securing tread chains to vehicle wheels.

Second, to provide an improved means for securing tread chains to vehicle wheels which permits the use of chains of considerable length so that they loosely embrace the tire and at the same time they are securely retained.

Third, to provide an improved means for securing tread chains to vehicle wheels by which the tread chains may be mounted upon the wheels without the necessity of boring the felly to provide securing holes.

Further objects and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a wheel equipped with my improved anti-slip device.

Fig. II is an enlarged detail view partially in section on a line corresponding to line 2—2 of Fig. III, showing structural details.

Fig. III is a detail transverse section on a line corresponding to line 3—3 of Fig. II.

Fig. IV is a detail view partially in section corresponding to that of Fig. II, showing a modified form of my invention.

In the drawing similar reference characters refer to similar parts throughout the several views, and the sectional views are taken looking in the direction of the little arrows at the ends of the section lines.

Referring to the drawing, the wheel 1 is shown mainly in conventional form. It comprises the spokes 2, the felly 3, the rim 4 and tire 5. I provide felly plates 6 having longitudinal recesses 7 in their inner sides engaged by the arms 8 of the spoke clamps 9. Each felly plate is provided with a pair of spoke clamps, the arms of which are slotted at 10 to receive the bolts 13 on the felly plates so that the clamps may be engaged with the spokes as shown in Fig. II, and the felly plates retained by clamping bolts and nuts 13 and 14. Owing to the fact that the spokes diverge outwardly, the bolts are not subjected to much strain in supporting the clamps in engaging position.

In the modification shown in Fig. IV, the clamping members are provided with ears 15 adapted to receive the bolts 16 so that the adjacent clamps are drawn together and clamped upon the spokes by means of these bolts. Each clamping plate is provided with opposed inturned hooks 17 having cross pieces 18 at their ends, the cross pieces being of such length as to permit links of a tread chain being engaged over the hooks by manipulating the hooks longitudinally thereof, but serving as guards effectively engaging the links with the tread chains loosely embracing the tire, that is, the tread chains may be of such length as to have free movement backward and forward on the tire thus preventing excessive wearing of the tire in one place and also securing a better gripping and holding action on the road bed.

The slotting of the arms of the spoke clamps provides for the varying distances between spokes of different wheels. The plates may be arranged between every spoke or between part of them only, as occasion may require. The chains may be quickly attached and detached as desired, but when attached, are securely retained.

Having thus described my invention, what I claim as new and desire to secure by Letters Patent is:

1. In a structure of the class described, the combination of a felly plate having longitudinal recesses in its inner side and inturned hooks having cross pieces at their ends, said hooks being adapted to receive the links of a tread chain, spoke clamps having longitudinally slotted arms engaging said recesses in said felly plate, and bolts on said felly plate engaging the slots of said arms.

2. In a structure of the class described, the combination of a felly plate having longitudinal recesses in its inner side and hooks adapted to receive the links of a tread chain, spoke clamps having longitudinally slotted arms engaging said recesses in said felly plate, and bolts on said felly plate engaging the slots of said arms.

3. In a structure of the class described, the combination of a felly plate having inturned T-headed hooks adapted to receive the links of a tread chain, spoke clamps having arms projecting over said felly plate, and bolts securing said felly plate to said arms.

4. In a structure of the class described, the combination of a felly plate having hooks adapted to receive the links of a tread chain, spoke clamps having arms projecting over said felly plate, and bolts for securing said clamping arms to said felly plate.

5. In a structure of the class described, the combination with felly plates having longitudinal recesses in their inner sides and hooks adapted to receive the links of tread chains, spoke clamps, each clamp having oppositely projecting slotted arms engaging the recesses in the felly plates, and bolts securing said arms to said felly plates engaging said slots.

6. In a structure of the class described, the combination of the felly plates adapted to be disposed on the felly of a wheel between the spokes thereof, said plates having chain engaging hooks, spoke clamps adapted to be mounted on a spoke between adjacent felly plates and having oppositely disposed arms projecting over the felly plates, and bolts securing said spoke clamp arms to said felly plate.

In witness whereof, I have hereunto set my hand and seal in the presence of two witnesses.

JOHN McDERMOTT. [L. S.]

Witnesses:
ANNIE E. PARRY,
HATTIE V. SAXTON.